Oct. 19, 1971  T. COLGREN ET AL  3,613,437
EXPANSION METER

Filed Nov. 25, 1969

INVENTORS
MORRIS KANE
THEODORE COLGREN
BY *Joseph A Barby*
ATTORNEY

3,613,437
EXPANSION METER
Theodore Colgren, Kalamazoo, and Morris W. Kane,
Parchment, Mich., assignors to Brown Company, New
York, N.Y.
Substituted for abandoned application Ser. No. 787,728,
Dec. 30, 1968. This application Nov. 25, 1969, Ser.
No. 879,864
Int. Cl. G01n 19/10, 35/34
U.S. Cl. 73—73     3 Claims

ABSTRACT OF THE DISCLOSURE

An improved expansion meter is provided for measuring the rate of expansion of a material as a function of the relative humidity of the surrounding environment. The expansion meter includes a sealed container provided with a deflection gauge having a pointer which is adapted to be shifted along the gauge scale by the expansion or contraction of the material under predetermined conditions of relative humidity within the container.

---

This application is a substitute for Ser. No. 787,728, filed Dec. 30, 1968, now abandoned.

BACKGROUND OF THE INVENTION

In many applications it is important to know in advance how much moisture can be absorbed from the air by various materials and the effect such absorption will have on the dimensions of the material. The hygroexpansitivity of the change of dimension (expansion or contraction) caused by an increase or decrease in the moisture content of materials is particularly important where' the exact register of multi-impression printing is necessary and also where the materials under observation are to be employed for templates, charts for recording instruments, data processing cards and other applications.

Heretofore measurements of the hygroexpansion of such materials has necessitated the use of expensive and elaborate equipment, such as wet and dry bulb psychrometers, dew point hygrometers and electric hygrometers. These instruments usually require relatively large operating areas, skilled technicians, expensive auxiliary equipment and must be calibrated at frequent intervals to insure the accuracy of the results.

SUMMARY OF THE INVENTION

It is therefore the principal object of this invention to provide a simple, compact, inexpensive instrument that can be properly employed by personnel of limited training and experience to test simultaneously and at different degrees of relative humidity, several specimens of a material to determine its rate of expansion as a function of moisture content due to environmental humidity.

These and other beneficial objects and advantages are attained in accordance with the present invention by providing an expansion meter in the form of a container having mounted therein an expansion gauge. The gauge includes a support structure to which a scale is affixed. A pointer is pivotally mounted to the support structure and is adapted to swing through an arc while remaining in communication with the scale indicia. Specimen receiving means are provided on the pointer and the support structure and are adapted to receive and retain a sample of the material under observation in such a manner that any change in the dimension of the specimen will cause a deflection of the pointer.

The container is further adapted to contain a hygroscopic salt solution which, when in an equilibrium condition, maintains the relative humidity within the container at a pre-selected level. A bulb is affixed to the container and serves to facilitate the flow of air through the container without necessitating any agitation of the expansion meter during the testing procedure.

BRIEF DESCRIPTION OF THE DRAWING

In the accompanying drawings.

DETAILED DESCRIPTION OF THE PREFERRED EMBODIMENT

Figures 1, 2:
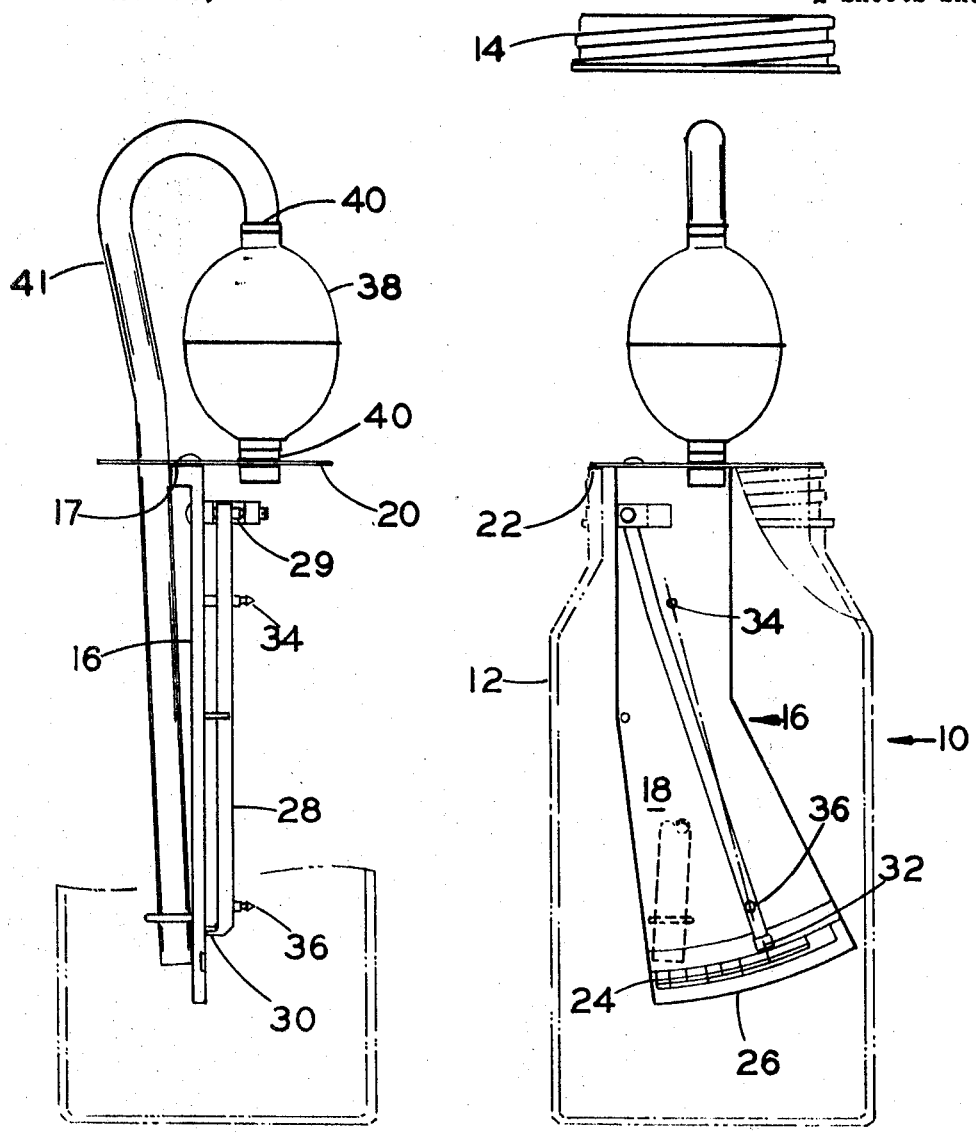
FIG. 1 is a side elevational view of an expansion meter in accordance with the present invention in a disassembled condition.
FIG. 2 is a front elevational view of the meter in FIG. 1.

Reference is now made to the drawings and in particular to FIG. 1 and FIG. 2 wherein an expansion meter 10 in accordance with the present invention is illustrated. Meter 10 consists basically of a transparent container 12 and the closure therefor 14. The container 12 may be manufactured of glass or transparent plastic and the closure may be formed of similar material or from a suitable metal. The container has an opening or mouth at one end which is sufficiently wide to permit the relatively easy insertion of the gauge into the container. The container and closure are provided with suitable threads which enable the closure to be tightly and securely coupled to the container. In one successful practice of the present invention the container comprises a two quart glass jar having a three-inch wide mouth.

A gauge 16 is adapted to be mounted within the container. Gauge 16 includes base 18 which is designed to depend from plate 20. Plate 20 in turn is adapted to be rigidly fixed in position between the top edge 22 of the container mouth and the under side of closure 14. The base 18 is a generally elongated member and extends into the interior of the container. An arcuate scale 24 is affixed to the lower end 26 of the support structure of base 18.

A pointer 28 is hingedly mounted to the upper end 17 of support structure 18 at pivot point 29 and extends towards the scale 24. Scale 24 is along an arcuate path which corresponds to the arc defined by the free end 30 of pointer 28 so that hair line 32 of pointer 28 constantly points to the indicia of scale 24.

A first mounting peg 34 is provided on support structure 18 and a second mounting peg 36 is provided on pointer 28. The top of container 12 contains threads adapted to securely receive closure 14 in an airtight fit. A compressible bulb 38 having open ends fitted with check valves 40 and tubing 41 communicates with the interior of the container through two openings in plate 20.

Figure 3:
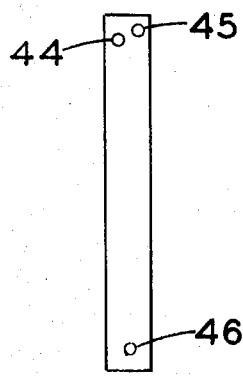
FIG. 3 is a front elevational view of a sample of the material under investigation cut to the proper size for placement in the expansion meter.

As shown in FIG. 3, in use, a strip of material under consideration is provided with three holes 44, 45, and 46. The distance between holes 44 and 46 is such that when the specimen is mounted on the instrument pegs 34 and 36, the hair line 32 of pointer 28 will line up at or near 0.1 on scale 24 allowing for expansion of the material on absorption of moisture.

The distance between holes 45 and 46 is such that when the specimen is mounted on the pegs 34 and 36 the hair line 32 of pointer 28 will line up at or near the upper end of the scale allowing for contraction of the specimen on loss of moisture.

A punch, not shown or described, is furnished with the instruments to perforate the material as shown in FIG. 3.

Prior to placing the specimen loaded gauge into container 12, the relative humidity within the container should be brought up to some predetermined, desired level by inserting an aqueous salt solution having a vapor pressure corresponding to the desired humidity level into the container. The salt should be combined with an appropriate amount of water so that both salt crystals and liquid are present and in equilibrium. Some salts and the relative humidities they produce are contained in the following table. The relative humidity values are obtained at room temperature (70° F.).

| Salt: | Percent relative humidity |
|---|---|
| Magnesium chloride | 33 |
| Potassium carbonate | 43 |
| Sodium dichromate | 52 |
| Cobaltous chloride | 63 |
| Sodium chloride | 75 |
| Potassium chloride | 86 |
| Zinc sulfate | 89 |
| Potassium nitrate | 93 |
| Potassium sulfate | 97 |

Figure 4:
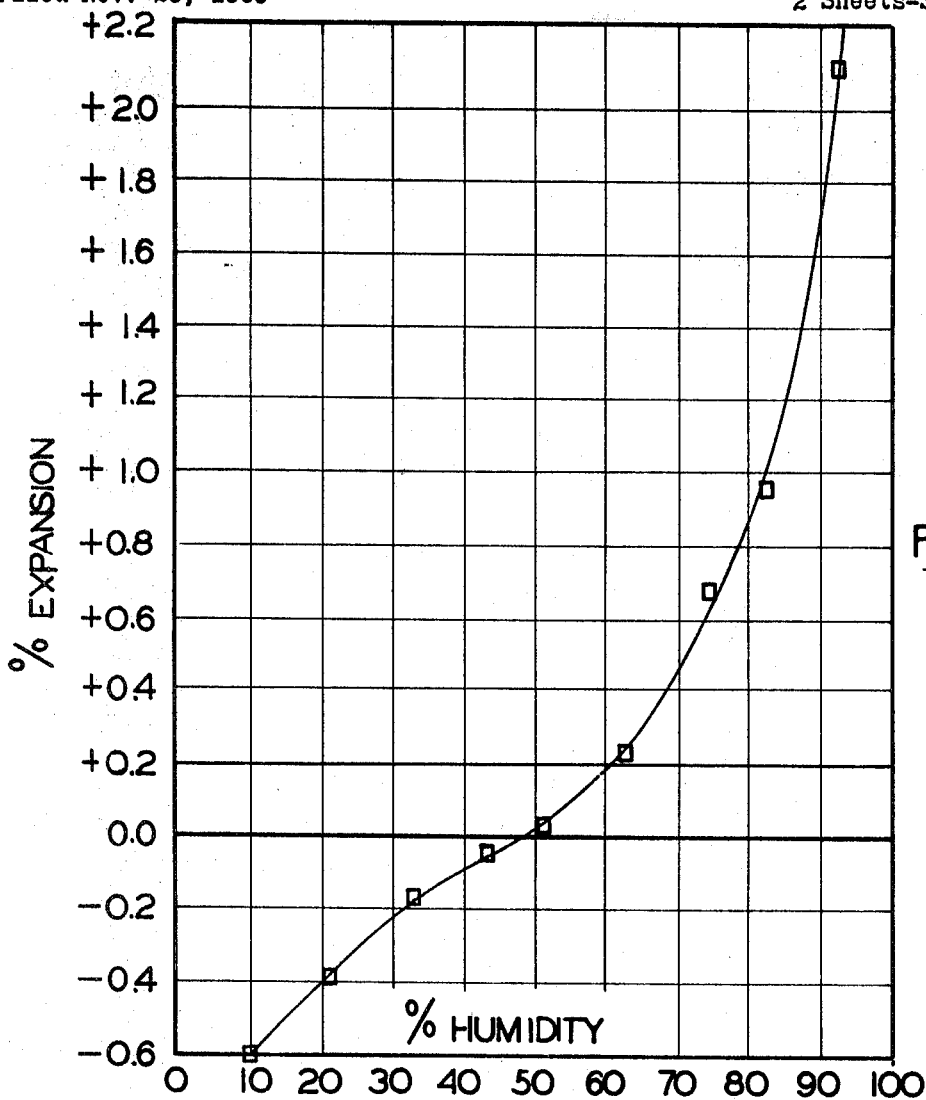
FIG. 4 is a representative curve of the expansion rate of a material of high hygroexpansitivity plotted as a function of the relative humidity to which it is subjected.
Figure 5:
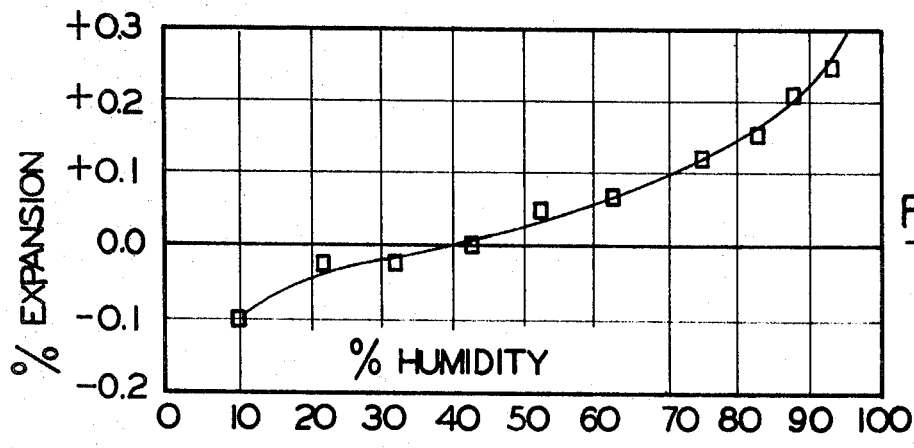
FIG. 5 is a representative curve of the expansion rate of a material of low hygroexpansitivity plotted as a function of the relative humidity to which it is subjected.

After the paper strip is mounted to the gauge pegs 34 and 36 in the manner described above, the reading of the scale should be noted and the gauge should be placed within the container and secured to the container by the closure 14. The gauge will be secured to the container when the closure is secured to the container. Once the container is sealed the atmosphere within the container should be circulated and this can effectively be done by squeezing and releasing bulb 38 several times. The air circulating procedure should be repeated several times at intervals until no further expansion (on contraction) of the specimen is noted. The scale reading at the time expansion (or contraction) ceases should be noted. By properly correlating the distance between holes 44 and 46 or 45 and 46 to the markings on the scale 24, the distance the scale deflects, that is, the distance between the final and original scale readings, may be made to express the percentage change in the specimen length. In order to determine the expansion coefficient of the material under consideration, several similar expansion meters of the type described should be utilized simultaneously with each container containing a different salt solution so that the percentage change for various relative humidities can be obtained. The obtained values should then be plotted as shown in FIG. 4 or 5 and the slope of the resultant curve represents the expansion rate of the material as a function of relative humidity.

Thus it will be seen that in accordance with our invention an inexpensive, easy to operate and highly accurate expansion meter is provided which may be utilized to determine the expansion rate of a material as a function of the relative humidity to which it is subjected.

We claim:

1. An expansion meter for determining the expansion of a material caused by the relative humidity to which the material is subjected comprising:
   a container;
   a closure for said container adapted to seal the container interior;
   an expansion gauge rigidly mounted within said container and including a gauge support structure, arcuate scale means on said support structure, a pivot point on said support structure, elongated deflection means pivotally mounted on said support structure at said pivot point and extending toward said scale means, indicating means on said deflection means adapted to indicate positions along said scale means, first specimen receiving means mounted on said support structure, second specimen receiving means mounted on said deflection means; and
   means for maintaining a substantially constant relative humidity level situated within the container;
   said elongated deflection means being adapted to pivot about said pivot point in response to a distance change between said first and second specimen receiving means of a material specimen mounted thereon.

2. The invention in accordance with claim 1 further comprising air circulating means adapted to circulate the air within said container.

3. The invention in accordance with claim 2 wherein said air circulating means comprises a compressible bulb mounted on said closure and having inlet and outlet openings thereof communicating with the container interior when the closure is mounted to the container.

References Cited

UNITED STATES PATENTS

| 2,061,424 | 11/1936 | Hutton | 73—29 |
| 3,201,871 | 8/1965 | Ragan | 73—73 X |

FOREIGN PATENTS

| 572,452 | 3/1933 | Germany | 73—73 |
| 698,426 | 11/1940 | Germany | 74—337 |
| 1,074,335 | 7/1967 | Great Britain | 73—337 |

RICHARD C. QUEISSER, Primary Examiner

C. E. SNEE III, Assistant Examiner

U.S. Cl. X.R.

73—337